July 22, 1952 A. J. STARR 2,604,301
EASY-OUT ATTACHMENT FOR TRACTORS
Filed May 10, 1948 2 SHEETS—SHEET 1
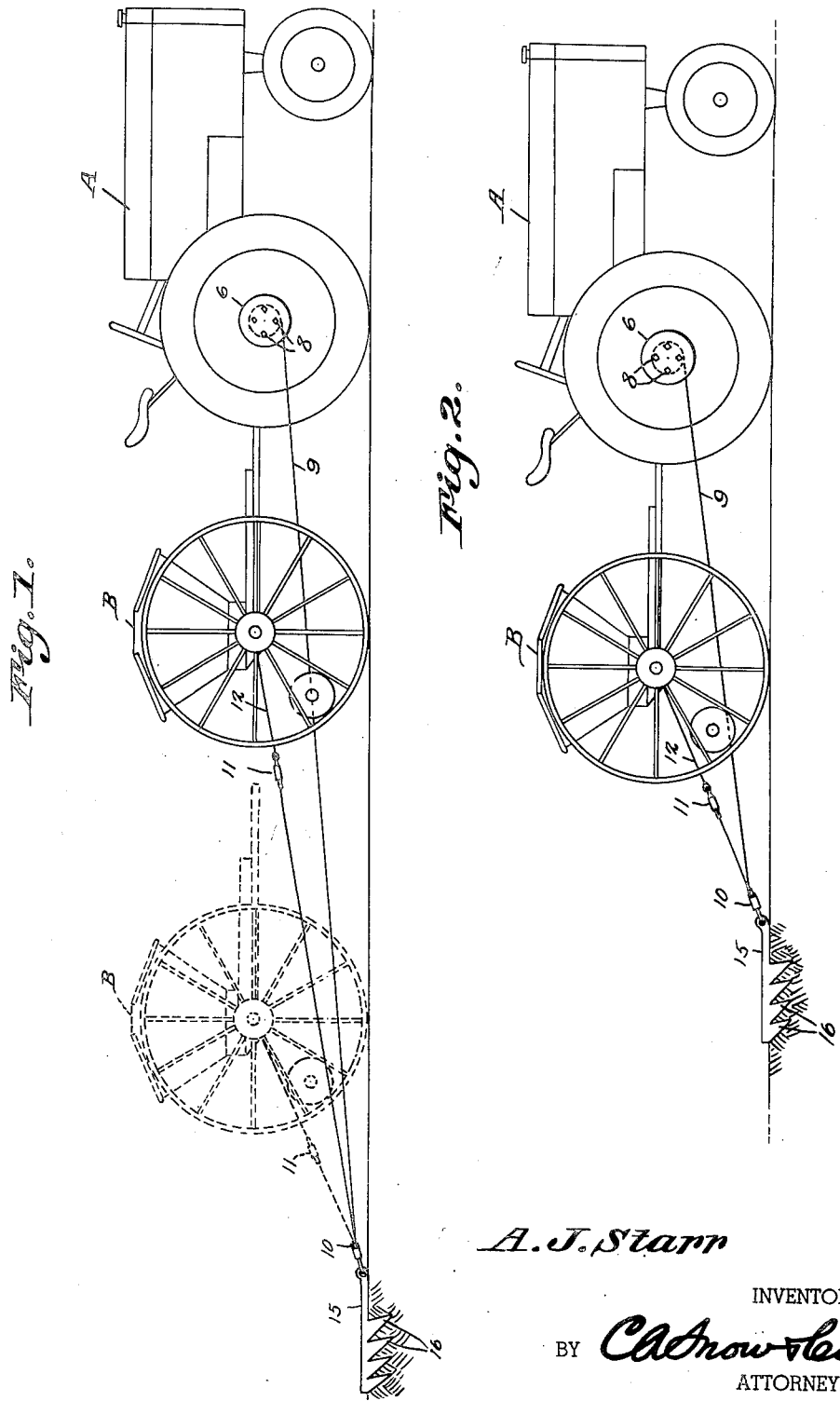
A. J. Starr
INVENTOR
BY C. A. Snow & Co.
ATTORNEYS.

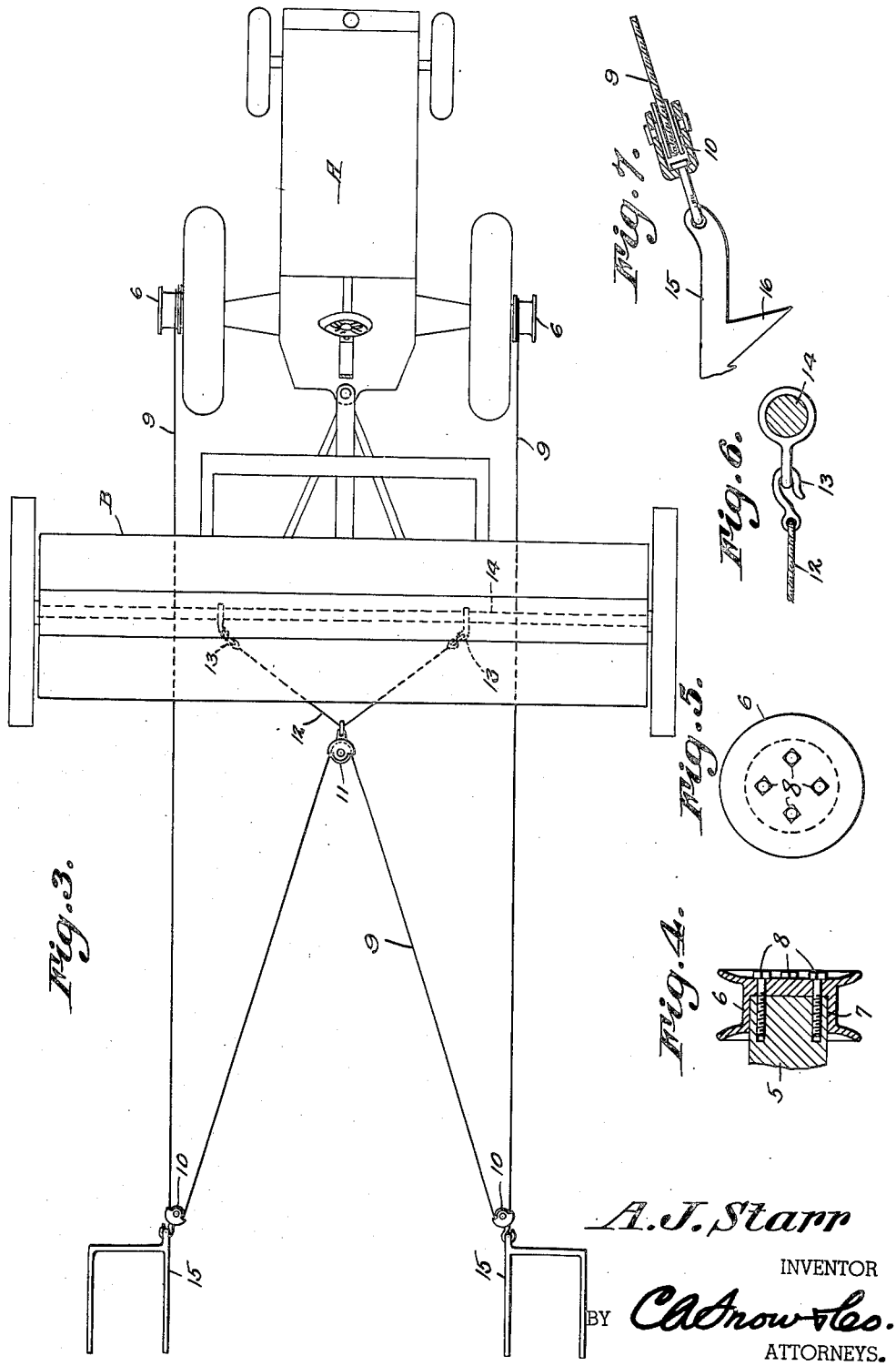

Patented July 22, 1952

2,604,301

UNITED STATES PATENT OFFICE 2,604,301

EASY-OUT ATTACHMENT FOR TRACTORS

Arthur J. Starr, Tower City, N. Dak.

Application May 10, 1948, Serial No. 26,202

1 Claim. (Cl. 254—135)

This invention relates to a tractor attachment, and more particularly, has reference to a device used with a tractor or other traction vehicle, and an implement pulled by the tractor, for the purpose of pulling the tractor out of mud in which it is mired.

It is an important object of the invention to provide a device of the type stated that can be attached and detached speedily and with ease, will operate efficiently whenever needed, and can be produced at low cost.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Figure 1 is a side elevational view showing a tractor and implement in full lines, as they appear with the device attached, and ready for the first step in pulling the tractor from the mud, the dotted lines indicating the position of the implement, at the completion of this step.

Figure 2 is a similar view showing the relative position of the tractor, implement, and device, at the completion of the second step, wherein the tractor has been pulled from the mud.

Figure 3 is a top plan view, the tractor and implement being shown in the position of Figure 1 (full lines).

Figure 4 is a transverse section through the end of one tractor hub, and a winch attachment secured thereto.

Figure 5 is a face view of the winch attachment.

Figure 6 is a section through the shaft of the implement, showing the attachment of one end of the device constituting the subject of invention.

Figure 7 is an elevation of a portion of an anchor embodied in the invention, and a pulley and cable connected thereto.

Referring to the drawings in detail, A designates a tractor or similar vehicle and B an implement coupled thereto. The device which is the subject of invention works equally well with any type of implement, or powered traction vehicle pulling the implement.

Referring particularly to Fig. 4, a winch attachment 6 for each hub at the rear of the vehicle A is provided, these attachments being formed with recesses 7 receiving the hub, the hub being designated 5 and constituting in itself no part of the present invention.

By means of bolts 8 or the like, the winch attachment 6 is secured to the hub 5 for rotation therewith.

It is understood that the winch attachments 6 can vary in design, according to the particular type of traction vehicle with which they are to be used, and the means of connection between the winch attachment and hub can also vary, within the spirit of the invention and the scope thereof as claimed.

In any event, one of these attachments is provided for each of the two rear hubs. The respective ends of a cable 9 are secured to the attachments 6 for winding thereon, this cable being trained around opposed shielded pulleys 10, and another shielded pulley 11, the pulleys 10 being respectively disposed between pulley 11 and the ends of the cable.

Pulley 11 is hung on a flexible connection 12, the ends of which are detachably secured, as at 13 to some portion of implement B, as for instance the axle 14.

The device includes a pair of anchors 15, these being ground anchors and being formed in the present instance in a U shape, from bar stock. The anchors are integrally formed with downwardly extended ground engaging teeth 16, which are preferably forwardly inclined as shown in Figs. 1, 2, and 7.

In use of the device, the vehicle driver may or may not have his winch attachments 6 mounted on the hub 5, at the time he enters a field for performing the desired operations thereon. Most usually, the operator will have the winch attachments 6 already mounted on the hubs, if it is known that the field is muddy. In spring, for example, the tractor will usually become mired on many occasions during a single operation.

If the vehicle A becomes mired, the operator attaches the respective ends of cable 9 to the winch attachment 6, and also attaches the flexible connection 12 to shaft 14 of the implement. He now moves to the rear of the implement, drawing cable 9 substantially taut, and sinks his ground anchors 15.

The next step is to uncouple the implement B from the tractor A.

Now, the operator spins the wheels of the tractor A, and since the tractor is mired, it is seen that this will cause implement B to be drawn rearwardly toward the anchors 15, until it reaches the dotted line position illustrated in Fig. 1.

The operator simply continues to spin the wheels of the tractor A, and it will be observed that now, the implement B in effect becomes a stationary post, and this causes the tractor to be pulled rearwardly towards the anchors 15, until it is in the position shown in Fig. 2.

This completes the operation, and it is only necessary now for the operator to remove the ground anchors 15 by prying them upwardly with any suitable bar or similar tool. The device may now be removed, so as to be ready for the next occasion when the tractor becomes mired.

It has been found in practice that a device as illustrated and described is capable of being attached and detached, and the entire operation of pulling the vehicle from the mud performed, in approximately five to ten minutes. The speed and ease with which this can be done is considered to be an important characteristic of the invention, and other important characteristics are its simplicity, durability, and efficiency in use.

What is claimed is:

The combination, with a traction vehicle, of winch attachments for the vehicle, means detachably connecting the winch attachments to hubs of drive wheels of the vehicle, a pair of ground anchors, said ground anchors being wholly free of connections to each other for independent location of the anchors relative to each other and to the vehicle, pulleys on the respective anchors, a center pulley, a wheeled structure disposed in the space between said anchors and vehicle and rollable toward and away from the vehicle, a detachable connection between the center pulley and said structure, and a cable connected at its ends to the respective winch attachments and cast around the pulleys, whereby on spinning of the vehicle wheels when mired said structure will be drawn to the anchors and will become stationary, and the vehicle will be drawn to said structure.

ARTHUR J. STARR.

REFERENCES CITED

The following references are of record in the file of this patent:

UNITED STATES PATENTS

| Number | Name | Date |
|---|---|---|
| 1,280,401 | Clark | Oct. 1, 1918 |
| 1,380,205 | Halvorson | May 31, 1921 |
| 1,508,750 | Nabors | Sept. 16, 1924 |
| 1,539,138 | Nicholson | May 26, 1925 |
| 1,676,197 | Marrinan | July 3, 1928 |
| 1,721,436 | Dubois et al. | July 16, 1929 |

FOREIGN PATENTS

| Number | Country | Date |
|---|---|---|
| 339,495 | Italy | Apr. 23, 1936 |